United States Patent
Tadokoro et al.

[11] Patent Number: 4,466,164
[45] Date of Patent: Aug. 21, 1984

[54] SUPERCALENDERING APPARATUS

[75] Inventors: Eiichi Tadokoro; Isao Yamamoto; Keiji Tanaka, all of Kanagawa, Japan

[73] Assignee: Fuji Photo Film Co., Ltd., Kanagawa, Japan

[21] Appl. No.: 278,035

[22] Filed: Jun. 29, 1981

[30] Foreign Application Priority Data

Jul. 21, 1980 [JP] Japan .................................. 55-99477

[51] Int. Cl.³ ............................................ B21B 27/02
[52] U.S. Cl. .................................................... 29/132
[58] Field of Search ........................................ 29/132

[56] References Cited
U.S. PATENT DOCUMENTS 3,511,729  5/1970  Williams .......................... 29/132 X
3,673,025  6/1972  Fukuyama et al. ............... 29/132 X
4,242,783  1/1981  Watanabe et al. .................... 29/132
4,324,177  4/1982  Tsuji et al. ........................ 29/132 X Primary Examiner—Eugene F. Desmond
Attorney, Agent, or Firm—Sughrue, Mion, Zinn, Macpeak, and Seas

[57] ABSTRACT

A supercalendering apparatus for smoothing the surface of a web by passing it through the nip between a metal roll and an elastic roll is disclosed. The elastic roll is composed of a core metal roll having a first coating made of a fibrous material wound about the core roll and an inorganic filler loaded epoxy resin impregnated in the fibrous material, and a second coating of an inorganic filler loaded epoxy resin formed on the first coating.

11 Claims, 1 Drawing Figure

SUPERCALENDERING APPARATUS

BACKGROUND OF THE INVENTION

The present invention relates to a supercalender apparatus for smoothing the surface of a web by passing it

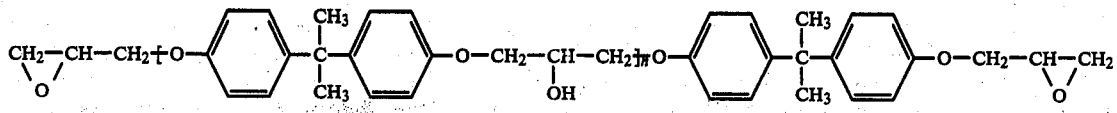

through the nip between a metal roll and an elastic roll. More particularly, the invention relates to an improved supercalender apparatus in which the elastic roll does not develop cracks due to shrinkage after shaping and in which the elastic roll has an improved resistance to heat and pressure in service.

As shown in Japanese Published Patent Application No. 36704/79, a highly heat-resistant and pressure-resistant elastic roll for use in a supercalender apparatus is conventionally manufactured by winding a fibrous material about a metal roll (core) and impregnating the fibrous material with a polyamide resin. A elastic roll has also been proposed that uses a core metal roll wherein the fibrous material is not wound about the core metal roll but instead a polyamide, polyurethane or epoxy reson blended with a filler such as quartz powder or carbon black is fixed to the surface of the core roll. However, as the outside diamter of the elastic roll is made larger, more cracks tend to develop due to shrinkage after shaping of the roll. Furthermore, an especially significant problem with the elastic roll having a polyamide resing coating has not been solved completely, that is, it becomes more difficult to maintain a desired surface temperature for the elastic roll as the operating temperature is increased so that the roll can easily be deformed.

SUMMARY OF THE INVENTION

Therefore, an object of the invention is to provide a supercalender apparatus whose elastic roll is free from the defects of the conventional product and which ensures consistent operations over an extended period of time.

This and other objects of the invention are achieved by a supercalender apparatus using an elastic roll including a core metal roll having a first coating made of a fibrous material such as glass fibers or carbon fibers wound about the core roll and an inorganic filler loaded epoxy resin impregnated in the fibrous material. A second coating of an inorganic filler loaded epoxy resin is formed on the first coating.

BRIEF DESCRIPTION OF THE DRAWING

The single FIGURE is a longitudinal sectional view of an elastic roll constructed according to the invention.

DESCRIPTION OF THE PREFERRED EMBODIMENTS

Figure 1:
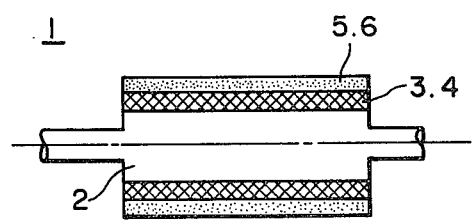

In the drawing, an elastic roll used in the apparatus of the invention, generally indicated at 1, includes a core metal roll 2 about which a glass fiber material 3 is wound helically or cross-helically. The fiber material is impregnated with an inorganic filler-loaded epoxy resin to form a first coating 4 wherein the fiber material 3 is strongly fixed to the metal roll 2. On the first coating 4 is formed a layer of a inorganic filler loaded epoxy resin 5, which forms a second coating 6. A strand or fabric of the glass fiber material is preferably wound helically or cross-helically about the core metal roll 2 to form a layer about 2 to 50 mm thick. The epoxy resin used in the first coating 4 and second coating 6 is generally of the phenoxy type of primarily the following formulae:

A curing agent may be used in combination with the epoxy resin. Aliphatic polyvalent amines (e.g., ethylene-diamine, diethylenetriamine and diethylaminopropylamine) can be used as the curing agent.

Typical examples of the epoxy resin are Epikote 1001, 1009 and 828 available from Shell International Chemicals Corp. A suitable epoxy resin for use in the elastic roll according to the invention has a molecular weight in the range of from 380 to 3750. Satisfactory roll strength and filler dispersion is not achieved if the molecular weight of the resin is less than 380. A resin whose molecular weight is greater than 3750 provides a roll which develops cracks relatively easily after shaping.

An inorganic filler such as quartz powder or carbon black is incorporated in the epoxy resin. The particle size of the filler, which varies according to its type, is desirably in a range of from 0.05 to 10μ. A filler whose particle size is outside the specified range does not provide a uniform dispersion and adversely affects the surface roughness of roll. It also increases the possibility of cracking in the roll surface. In consideration of the roll strength, 50 to 300 parts by weight of the inorganic filler is desirably added to 100 parts by weight of the epoxy resin. The second coating 6 desirably has a thickness of about 0.5 to 5 mm after the surface is finished by grinding.

The elastic roll 1 of the invention has the first coating 4 and second coating 6 on its surface. With this construction, cracking due to shrinkage is prevented regardless of the outside diameter of the roll 1. This advantage is considered to result mainly from the first coating 4 made of the glass fiber material and inorganic filler loaded epoxy resin. The elastic roll has and maintains satisfactory heat resistance, pressure resistance and surface smoothness.

It is to be understood that the glass fiber material may be replaced by carbon black. Using carbon black is effective not only for preventing cracking due to shrinkage but also for removing static buildup easily.

The advantages of the invention will now be described in greater detail with reference to the following example, which is given here for illustrative purposes only and is by no means intended to limit the scope of the invention.

EXAMPLE

Twenty-five elastic rolls were prepared by forming on a core metal roll having a diameter of 250 mm the coatings indicated in Table 1 under the conditions indicated in Table 2. These rolls are referred to as Sample Nos. 1 to 25. Magnetic tape samples were prepared by applying a coating solution of a magnetic layer of the following composition onto a polyethylene terephthalate base (14.5μ thick) and drying the same until the thickness of the coating was 5 μm.

| Composition of the coating solution | |
|---|---|
| Magnetic material (3% Co-coated FeO$_x$) 4/3 ≦ X ≦ 3/2 | 300 g |
| Vinyl chloride/vinyl acetate copolymer (degree of polymerization = 350) (87:13) | 25 g |
| Polyester polyol(*) | 11 g |
| Soybean lecithin | 3 g |
| Silicone oil (dimethyl polysiloxane) | 0.2 g |
| Polyisocyanate (75 wt % ethyl acetate solution of a reaction product of 3 mol of 2,4-toluene diisocyanate compound and 1 mol of trimethylolpropane) | 10 g |
| Methyl ethyl ketone | 400 g |
| Toluene | 900 g |

*Reaction product of 1 mol of adipic acid, 1 mol of diethylene glycol and 0.06 mol of trimethylopropane
(viscosity = 1000 cP at 75° C., specific gravity = 1.18, OH ratio = 60, acid value <2)

Each elastic roll was placed opposite a metal roll, and the tape samples were calendered by passing them between the rolls at a speed of 100 m/min at a nip pressure of 300 kg/cm. The calendering temperature was maintained at about 100° C. The results of the calendering are set forth in Table 3 below.

TABLE 1

| | Factors and their conditions | | | | | | | | | |
|---|---|---|---|---|---|---|---|---|---|---|
| | | Structure of 1st layer | | | | Structure of 2nd layer | | | | |
| | | | Powdered quartz filler | | | | | Powdered quartz filler | | |
| Sample No. | Glass fiber material | Epoxy resin m.w. | Particle size | Amount | Thickness | Epoxy resin m.w. | Particle size | Amount | Thickness | |
| 1 | absent | present 1 | absent | — | — | 1 | absent | absent | — | — | — | (For the meaning of the conditions 1 to 5, see Table 2.) |
| 2 | " | " " | present | 1 | 1 | " | " | " | " | " | " |
| 3 | present | " " | " | " | " | " | " | " | " | " | " |
| 4 | " | " " | " | " | " | " | present | 1 | " | " | 1 |
| 5 | " | " " | " | " | " | " | " | " | present | 1 | 1 | " | optimum |
| 6 | " | " 2 | " | " | " | " | " | 2 | " | " | " | criticality of |
| 7 | " | " 3 | " | " | " | " | " | 3 | " | " | " | m.w. of epoxy |
| 8 | " | " 4 | " | " | " | " | " | 4 | " | " | " |
| 9 | " | " 5 | " | " | " | " | " | 5 | " | " | " |
| 10 | " | " 1 | " | 2 | " | " | " | 1 | " | 2 | " | criticality of |
| 11 | " | " " | " | 3 | " | " | " | " | 3 | " | " | filler size |
| 12 | " | " " | " | 4 | " | " | " | " | 4 | " | " |
| 13 | " | " " | " | 5 | " | " | " | " | 5 | " | " |
| 14 | " | " " | " | 1 | 2 | " | " | " | 1 | 2 | " | criticality of |
| 15 | " | " " | " | " | 3 | " | " | " | " | 3 | " | amount of filler |
| 16 | " | " " | " | " | 4 | " | " | " | " | 4 | " |
| 17 | " | " " | " | " | 5 | " | " | " | " | 5 | " |
| 18 | " | " " | " | " | 1 | " | " | " | " | 1 | " | effect of |
| 19 | " | " " | " | " | " | 3 | " | " | " | " | " | 1st layer |
| 20 | " | " " | " | " | " | 4 | " | " | " | " | " |
| 21 | " | " " | " | " | " | 5 | " | " | " | " | " |
| 22 | " | " " | " | " | " | 1 | " | " | " | " | 2 | effect of |
| 23 | " | " " | " | " | " | " | " | " | " | " | 3 | 2nd layer |
| 24 | " | " " | " | " | " | " | " | " | " | " | 4 |
| 25 | " | " " | " | " | " | " | " | " | " | " | 5 |

TABLE 2

| | Condition | | | | |
|---|---|---|---|---|---|
| Factor | 1 | 2 | 3 | 4 | 5 |
| m.w. of epoxy resin | 700 | 380 | 3,750 | 330 | 4,000 |
| Particle size of quartz filler (μ) | 5 | 0.05 | 10 | 0.03 | 12 |
| Amount of filler (per 100 g of epoxy) | 80 | 50 | 300 | 40 | 350 |
| Thickness of 1st layer (mm) | 8 | 2 | 50 | 1 | 55 |
| Thickness of 2nd layer (mm) | 2 | 0.5 | 5 | 0.3 | 6 |

TABLE 2-continued

| | Condition | | | | |
|---|---|---|---|---|---|
| Factor | 1 | 2 | 3 | 4 | 5 |
| 2nd layer (mm) | | | | | |

TABLE 3

| Sample No. | Cracking | Video S/N dB | Chroma S/N dB | Overall rating |
|---|---|---|---|---|
| 1 | present | 0 | 0 | no good |
| 2 | " | +2 | +3 | " |
| 3 | absent | +2 | +3 | not durable, no good |
| 4 | " | 0 | 0 | no good |
| 5 | " | +2 | +3 | good |
| 6 | " | +1 | +1.5 | " |
| 7 | " | +0.5 | +1.0 | " |
| 8 | present | −0.5 | 0 | no good |
| 9 | " | −0.5 | 0 | " |
| 10 | absent | +1 | +1.5 | good |
| 11 | " | +0.5 | +1.0 | " |
| 12 | " | −0.5 | 0 | no good |
| 13 | " | −1.5 | −2.5 | " |
| 14 | " | 1 | 2 | good |
| 15 | " | 0.5 | 1 | " |
| 16 | " | 0 | −0.5 | no good |
| 17 | present | 1 | 2 | " |
| 18 | absent | +2 | −2.5 | good |
| 19 | " | 2 | 2.5 | " |
| 20 | present | 1 | 1.5 | good |
| 21 | " | 0.5 | 1.5 | " |
| 22 | absent | 2 | 2.5 | good |
| 23 | " | 1.5 | 2 | " |
| 24 | present | 1.5 | 2 | no good |
| 25 | " | 1.0 | 2 | " |

S/N Measurement System

Each calendered tape sample was slit to ½ inch wide and installed in a VHS cassette-half which was placed in a VHS video tape recorder (Mcloud 8800 manufactured by Matsushita electric Industries Co., Ltd.). The recorder was connected to a signal generator and a noise meter as indicated below.

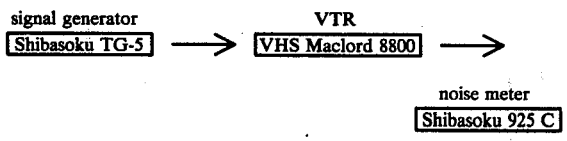

Measuring Conditions

Chroma S/N (AM): 10 KHz–500 KHz

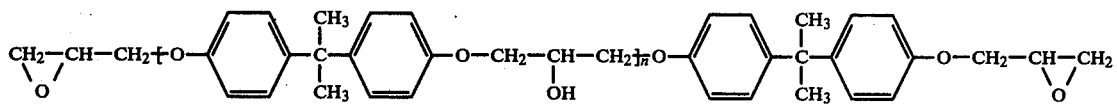

Video S/N (with weighting): 10 KHz–4 MHz

Results

Samples Nos. 5, 6, 7, 10, 11, 14, 15, 18, 19, 22 and 23 that had the first coating (2–50 mm thick) made of a glass fiber material impregnated with a blend of 50–500 g of quartz powder (0.05–10μ in size) and 100 g of an epoxy resin (m.w. 380–3750) and the second coating (0.5–5 mm thick) made of the same quartz powder and epoxy resin yielded far better overall ratings than the other samples with respect to shrinkage cracking, electromagnetic conversion characteristics and durability.

What is claimed is:

1. In a supercalendering apparatus for smoothing the surface of a web by passing it through the nip between a metal roll and an elastic roll, the improvement wherein said elastic roll comprises a core metal roll having a first coating made of a fibrous material wound about said core roll and an inorganic filler loaded epoxy resin impregnated in said fibrous material; and a second coating of an inorganic filler loaded epoxy resin having a ground surface and a thickness in a range of 0.5 to 5 mm formed on said first coating.

2. The supercalendering apparatus of claim 1 wherein said fibrous material is wound helically.

3. The supercalendering apparatus of claim 1 wherein said fibrous material is wound cross-helically.

4. The supercalendering apparatus of claim 1 wherein said fibrous material is wound about said core roll to a thickness in a range of 2 to 50 mm.

5. The supercalendering apparatus of claim 1 wherein said epoxy resin is of a phenoxy type primarily of formulae:

6. The supercalendering apparatus of claim 5 further comprising a curing agent provided in combination with said epoxy resin.

7. The supercalendering apparatus of claim 6 wherein said curing agent is an aliphatic polyvalent amine selected from the group consisting of ethylene-diamine, ethylenetriamine and ethyleneaminopropylamine.

8. The supercalendering apparatus of claim 1 wherein said epoxy resin has a molecular weight in a range of from 380 to 3750.

9. The supercalendering apparatus of claim 1 wherein said inorganic filler is a material selected from the group consisting of quartz powder and carbon black.

10. The supercalendering apparatus of claim 9 wherein said inorganic filler has a particle size in a range of 0.05 to 10μ.

11. The supercalendering apparatus of claim 10 wherein said inorganic filler is present in a proportion of 50 to 300 parts by weight per 100 parts by weight of said epoxy resin.

* * * * *